US012567956B2

(12) United States Patent (10) Patent No.: US 12,567,956 B2
Vinokur et al. (45) Date of Patent: Mar. 3, 2026

(54) QUANTUM KEY DISTRIBUTION DEVICE AND METHOD SUITABLE FOR ESTABLISHING A GLOBAL QUANTUM KEY DISTRIBUTION NETWORK

(71) Applicant: Terra Quantum AG, St. Gallen (CH)

(72) Inventors: Valerii M. Vinokur, St. Gallen (CH); Nikita S. Kirsanov, St. Gallen (CH); Gordey B. Lesovik, St. Gallen (CH); Pavel Sekatski, St. Gallen (CH); Alexander Kolybelnikov, St. Gallen (CH); Valeria Pastushenko, St. Gallen (CH); Alexey Kodukhov, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 278 days.

(21) Appl. No.: 18/352,845

(22) Filed: Jul. 14, 2023

(65) Prior Publication Data

US 2024/0031139 A1 Jan. 25, 2024

(30) Foreign Application Priority Data

Jul. 22, 2022 (EP) .................................... 22186505

(51) Int. Cl.
*H04L 9/08* (2006.01)

(52) U.S. Cl.
CPC .......... *H04L 9/0852* (2013.01); *H04L 9/0838* (2013.01)

(58) Field of Classification Search
CPC ... H04L 9/0852; H04L 9/0838; H04L 9/0855; H04L 9/0869; H04B 10/70; H04B 10/516; H04B 10/548
See application file for complete search history.

(56) References Cited

U.S. PATENT DOCUMENTS

| 2003/0169880 A1* | 9/2003 | Nambu ................. H04L 9/0852 |
| | | 380/256 |
| 2008/0013738 A1* | 1/2008 | Tajima ................. H04L 9/0852 |
| | | 380/278 |

(Continued)

FOREIGN PATENT DOCUMENTS

| EP | 2885886 B1 | 2/2019 |
| JP | 2016-025623 A | 2/2016 |
| JP | 2019-216413 A | 12/2019 |
| JP | 2020-145672 A | 9/2020 |
| JP | 2021-507578 A | 2/2021 |

(Continued)

OTHER PUBLICATIONS

Chapuran et al., "Quantum Communications Over Optical Fiber Networks," *Proc. of SPIE*, 6710, 12 pp. (Dec. 31, 2007).

(Continued)

*Primary Examiner* — Baotran N To

(74) *Attorney, Agent, or Firm* — Fitch Even Tabin & Flannery LLP

(57) ABSTRACT

A quantum key distribution device comprises an input signal path receiving a plurality of optical input signals from a transmitter device, an output signal path connected to the input signal path at a first end and emitting a plurality of first optical output signals at a second end, and a detector signal path connected to the input signal path at a third end and comprising a photon detector device at a fourth end opposite to the third end. The photon detector detects optical input signals from the transmitter device, and the quantum key distribution device establishes a shared quantum cryptographic key with the transmitter device based on the detected optical input signals. The input signal path forms an input path of a Mach-Zehnder interferometer, and the output signal path and the detector signal path form output paths of the Mach-Zehnder interferometer.

11 Claims, 11 Drawing Sheets

(56) References Cited

U.S. PATENT DOCUMENTS

| | | | | |
|---|---|---|---|---|
| 2008/0273703 A1* | 11/2008 | LaGasse | ............... | H04L 9/0852 |
| | | | | 380/278 |
| 2009/0106553 A1* | 4/2009 | Wang | ................. | A63B 22/0605 |
| | | | | 713/168 |
| 2009/0180615 A1* | 7/2009 | Trifonov | ................ | H04B 10/70 |
| | | | | 380/278 |
| 2010/0080394 A1* | 4/2010 | Harrison | .............. | H04B 10/114 |
| | | | | 380/278 |

FOREIGN PATENT DOCUMENTS

| | | |
|---|---|---|
| RU | 2621605 C2 | 6/2017 |
| WO | WO 2014/042822 A3 | 3/2014 |

OTHER PUBLICATIONS

Dai et al., "An Integrated Quantum Secure Communication System," *Science Science China*, 54 (12): 2578-2591 (Dec. 3, 2011).

European Patent Office, Extended European Search Report in European Patent Application No. 22186505.8, 11 pp. (Jan. 13, 2023).

Kirsanov et al., "Long-Distance Quantum Key Distribution Based on the Physical Loss Control," *Cornell Preprint Server*, arXiv:2015.00035 (Apr. 30, 2021).

Tang et al., "Demonstration of an Active Quantum Key Distribution Network," *Proc. of SPIE*, 6305, 6 pp. (Aug. 31, 2006).

Tayduganov et al., "Optimizing the Deployment of Quantum Key Distribution Switch-Based Networks," *Optics Express*, 29 (16): 24884-24898 (Apr. 15, 2021).

Toliver et al., "Experimental Investigation of Quantum Key Distribution Through Transparent Optical Switch Elements," *IEEE Photonics Technology Letters*, 15 (11): 1669-1671 (Nov. 1, 2003).

Wang et al., "Broadband 2 x 2 Lithium Niobate Electrooptic Switch Based on a Mach-Zehnder Interferometer with Counter-Tapered Directional Couplers," *Appl. Opt.*, 56 (29): 8164-8168 (Oct. 2017).

Japan Patent Office, Office Action in Japanese Patent Application No. 2023-098196, 11 pp. (Oct. 1, 2024).

* cited by examiner

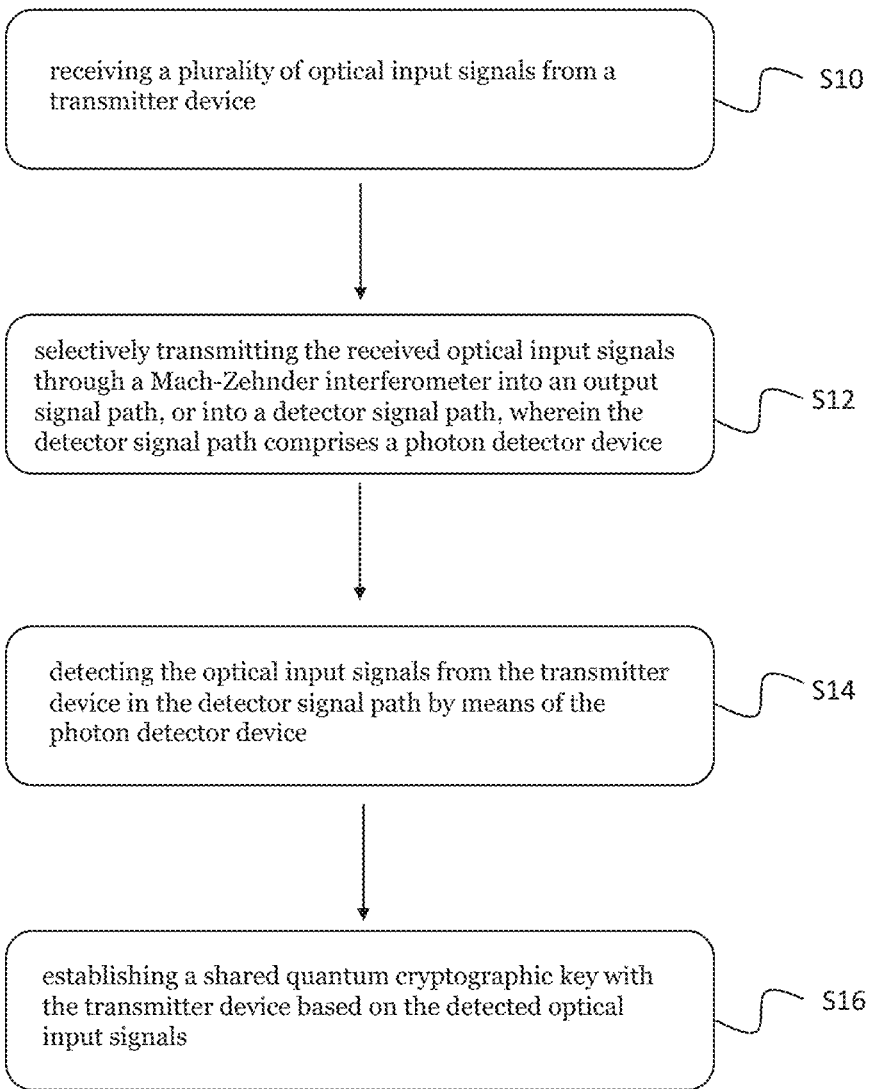

receiving a plurality of optical input signals from a transmitter device     S10 selectively transmitting the received optical input signals through a Mach-Zehnder interferometer into an output signal path, or into a detector signal path, wherein the detector signal path comprises a photon detector device     S12 detecting the optical input signals from the transmitter device in the detector signal path by means of the photon detector device     S14 establishing a shared quantum cryptographic key with the transmitter device based on the detected optical input signals     S16

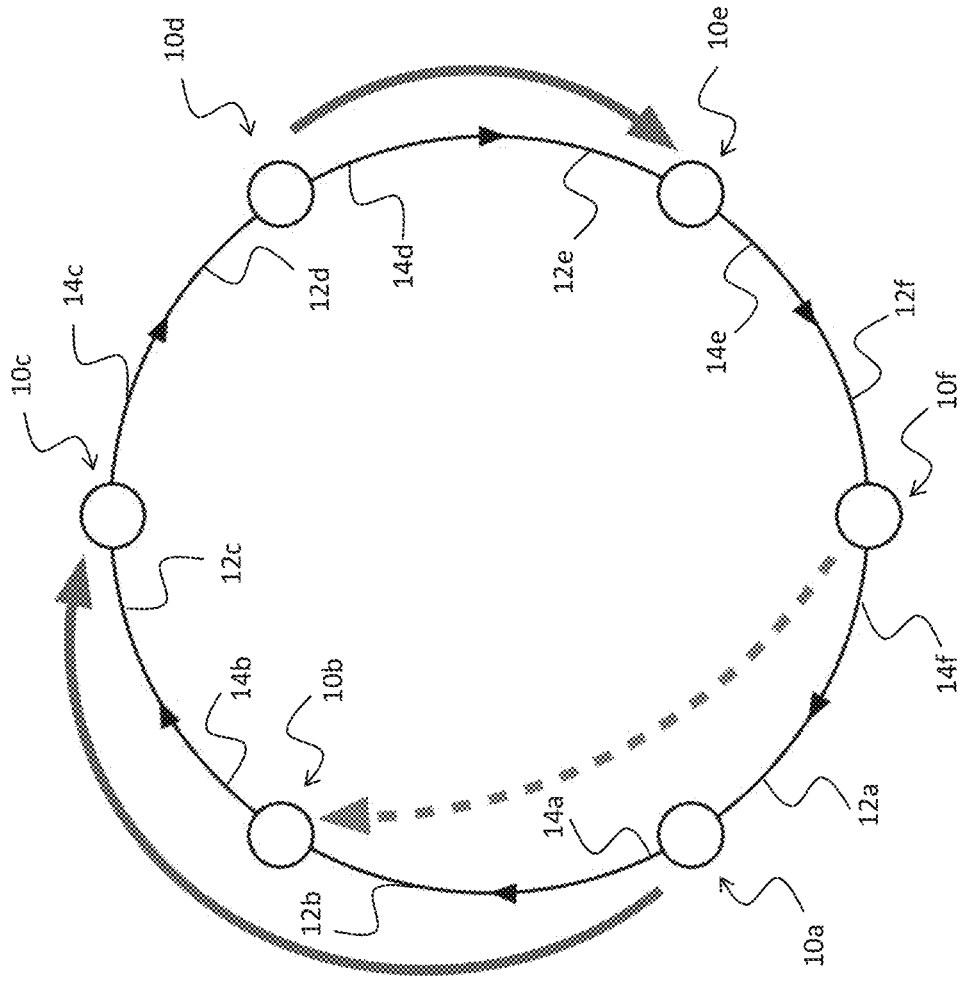
Fig. 7

QUANTUM KEY DISTRIBUTION DEVICE AND METHOD SUITABLE FOR ESTABLISHING A GLOBAL QUANTUM KEY DISTRIBUTION NETWORK

CROSS-REFERENCE TO RELATED APPLICATIONS

The instant application claims priority to European Patent Application No. 22186505.8, filed Jul. 22, 2022, which is incorporated herein in its entirety by reference.

FIELD OF THE DISCLOSURE

The present disclosure generally relates to techniques for quantum key distribution (QKD), and to techniques for establishing a global network for quantum key distribution that does not rely on trusted third parties.

BACKGROUND OF THE INVENTION

Upcoming quantum computing prospects threaten the very pillars of the security of classical communication networks. The confidence and trust in security offered by conventional (classical) cryptography rests on the belief in an insurmountable computational complexity of breaking the protection. However, quantum computers hold the promise of overrunning the existing complexities. Quantum key distribution (QKD) is a technology that overcomes these restrictions and allows to establish a provably secure classical key between legitimate parties. Techniques have recently been established to exchange quantum cryptographic keys over very long distances, potentially spanning the entire globe, cf. N. S. Kirsanov et al., "Long-distance quantum key distribution based on the physical loss control", Cornell Preprint Server, arXiv:2105.00035 v1 (30 Apr. 2021).

Quantum key distribution networks that allow to establish provably secure classical cryptographic keys between more than two legitimate users, i.e., in a network setting, have also been investigated. X. Tang et al., "Demonstration of an active quantum key distribution network", Proceedings of SPIE 6305, Quantum Communications and Quantum Imaging IV, 630506 (29 Aug. 2006) investigate quantum key distribution with polarization coding over fiber links in a branch configuration or a loop configuration. P. Toliver et al., "Experimental Investigation of Quantum Key Distribution Through Transparent Optical Switch Elements", IEEE Photonics Technology Letters, vol. 15, No. 11, November 2003, investigate QKD with switched multi-node architectures that rely on optical switch elements such as lithium niobate, microelectromechanical systems (MEMS) and optomechanical systems. For additional reference to lithium niobate optical switches, cf. H. Okayama, "Lithium Niobate Electro-Optic Switching", Springer, Boston, 2006; and H. Wang et al., "Broadband 2×2 lithium niobate electrooptic switch based on a mach-zehnder interferometer with counter-tapered directional couplers", Appl. Opt. 56 (29) 8164-8168, October 2017.

QKD switch-based networks that rely on commercially available optical switches Thorlabs OSW22-2×2 are disclosed in A. Tayduganov et al., "Optimizing the deployment of quantum key distribution switch-based networks", Cornell preprint server arXiv:2104.04155v2 (15 Apr. 2021).

In view of the prior art, what is required is a QKD network that permits to reliably share cryptographic keys at high key rates over long distances, effectively spanning the entire globe.

BRIEF SUMMARY OF THE INVENTION

In a first aspect, the disclosure relates to a quantum key distribution device, comprising an input signal path adapted to receive a plurality of optical input signals from a transmitter device, an output signal path connected to the input signal path at a first end and adapted to emit a plurality of first optical output signals at a second end opposite to the first end, and a detector signal path connected to the input signal path at a third end and comprising a photon detector device at a fourth end the opposite to the third end. The photon detector device is adapted to detect the optical input signals from the transmitter device. The quantum key distribution device is adapted to establish a shared quantum cryptographic key with the transmitter device based on the detected optical input signals. The input signal path forms an input path of a Mach-Zehnder interferometer, and the output signal path and the detector signal path form output paths of the Mach-Zehnder interferometer.

Advantageously, the Mach-Zehnder interferometer may allow to build a network node for a QKD network that may allow a user to switch between a receiving mode in which signals are detected, and a transmitting mode in which signals are passed on to a different node in the network. Moreover, the Mach-Zehnder interferometer may allow for very high switching speeds in the range of a few nanoseconds (ns) or even below at very low losses and may hence allow for a fast and reliable exchange of cryptographic keys on a global scale.

In the context of the present disclosure, the input signal path and/or the output signal path and/or the detector signal path may denote any communication path adapted to transmit optical signals. For instance, the input signal path and/or the output signal path and/or the detector signal path may comprise an optical fiber, or a free space optical signal link.

The respective first, second, third and fourth ends of the respective signal paths do not express any order or ranking of the ends of the signal paths, but merely serve for notationally distinguishing between the different ends of the signal paths. In some embodiments, the first, second, third and fourth ends may be at different locations. In other embodiments, two or more of the first, second, third and fourth ends may be at the same location or may coincide.

The transmitter device may denote any device adapted to transmit optical signals, such as single photons or bunches of photons, to the quantum key distribution device. In particular, the transmitter device may comprise a photon source.

In the context of the present disclosure, the photon detector device may denote any device adapted to detect optical signals, such as photons. In some embodiments, the photon detector device may be adapted to detect single photons. In other embodiments, the photon detector device may be adapted to detect bunches of photons, or a light intensity.

BRIEF DESCRIPTION OF THE SEVERAL VIEWS OF THE DRAWING(S)

FIG. 4 is a flow diagram of a method for quantum key distribution according to an embodiment according to an embodiment of the present disclosure.

FIG. 5 is a schematic illustration of a quantum key distribution network according to an embodiment according to an embodiment of the present disclosure.

Figure 6:
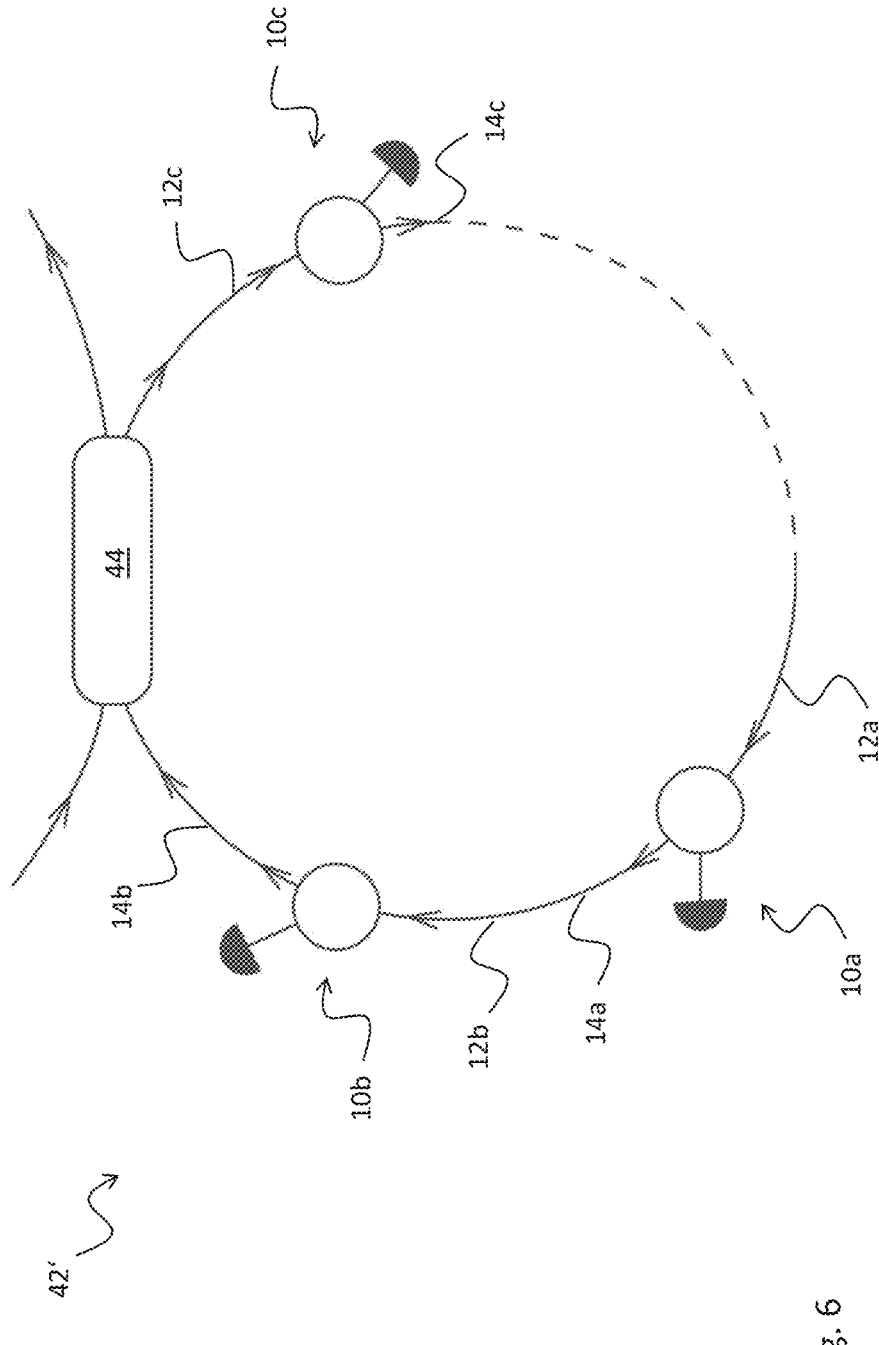

FIG. 6 schematically illustrates a quantum key distribution network in a ring topology according to an embodiment according to an embodiment of the present disclosure.

FIG. 7 schematically illustrates a network operation method for quantum key distribution in a quantum key distribution network having a ring topology, according to an embodiment according to an embodiment of the present disclosure.

Figures 8A, 8B:
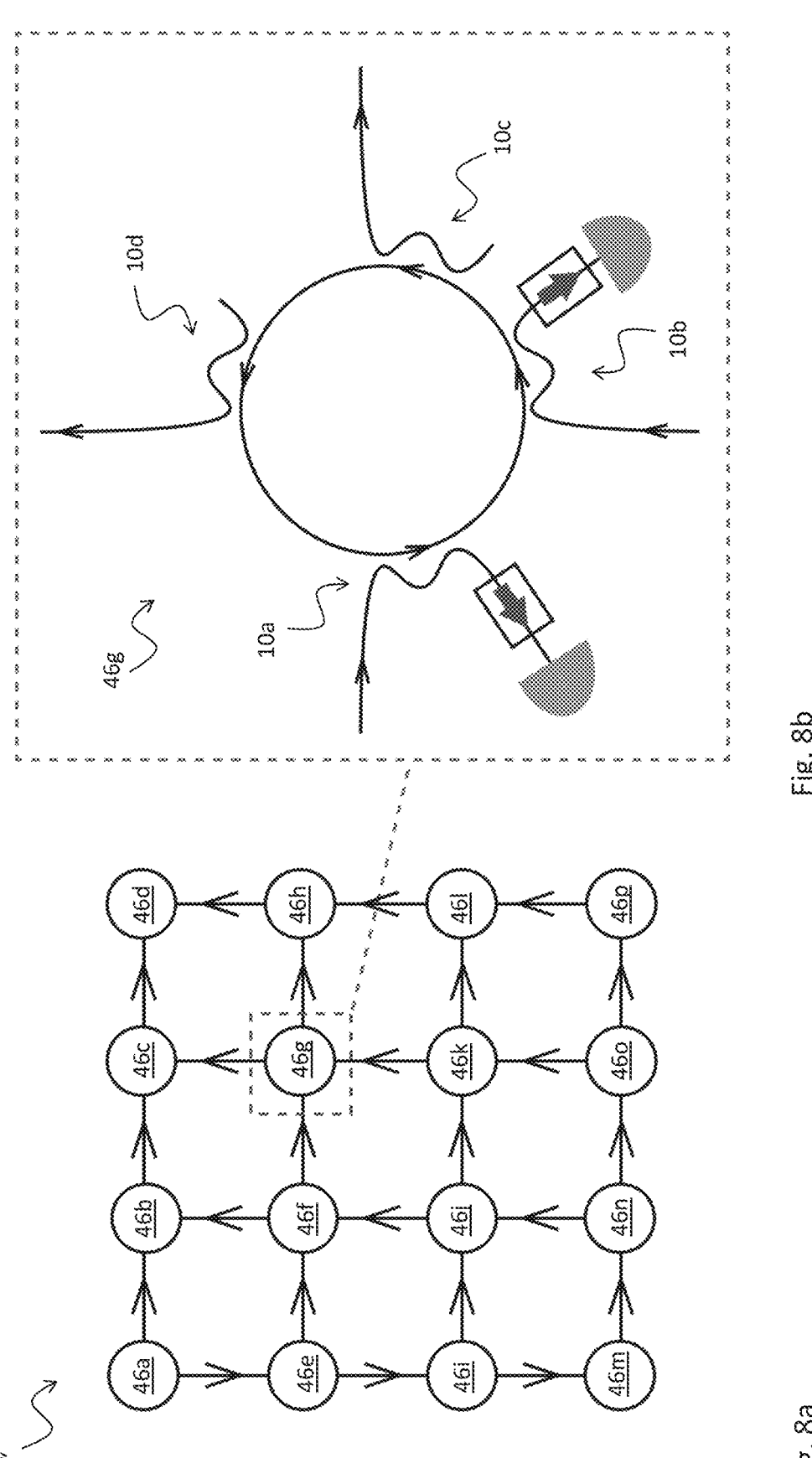

FIG. 8a schematically illustrates a quantum key distribution network in a lattice topology according to an embodiment according to an embodiment of the present disclosure.

FIG. 8b schematically illustrates a lattice node according to an embodiment, in a quantum key distribution network having a lattice topology according to an embodiment of the present disclosure.

Figure 9:
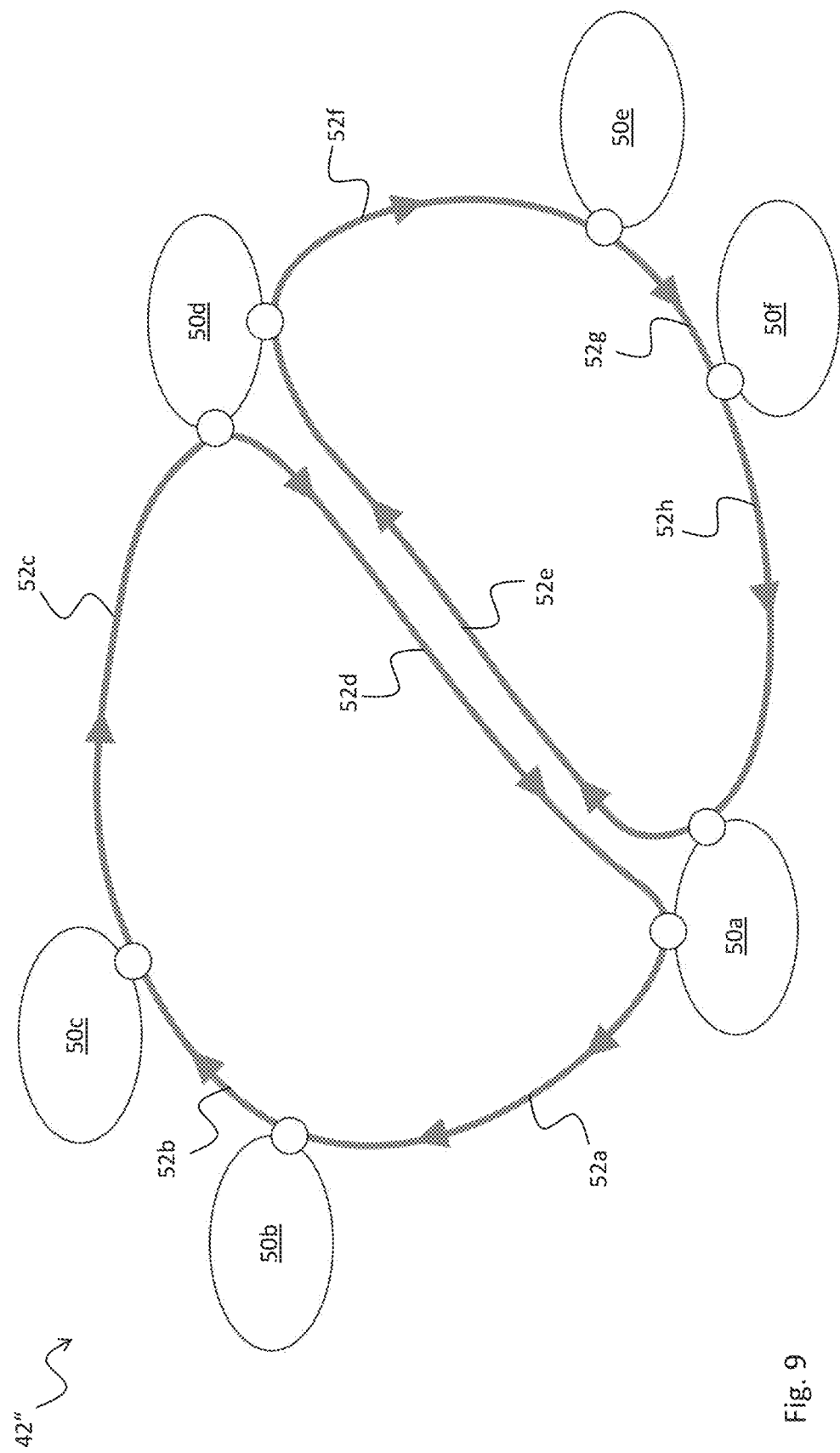

FIG. 9 schematically illustrates a quantum key distribution network in a cluster topology according to an embodiment according to an embodiment of the present disclosure.

Figure 10:
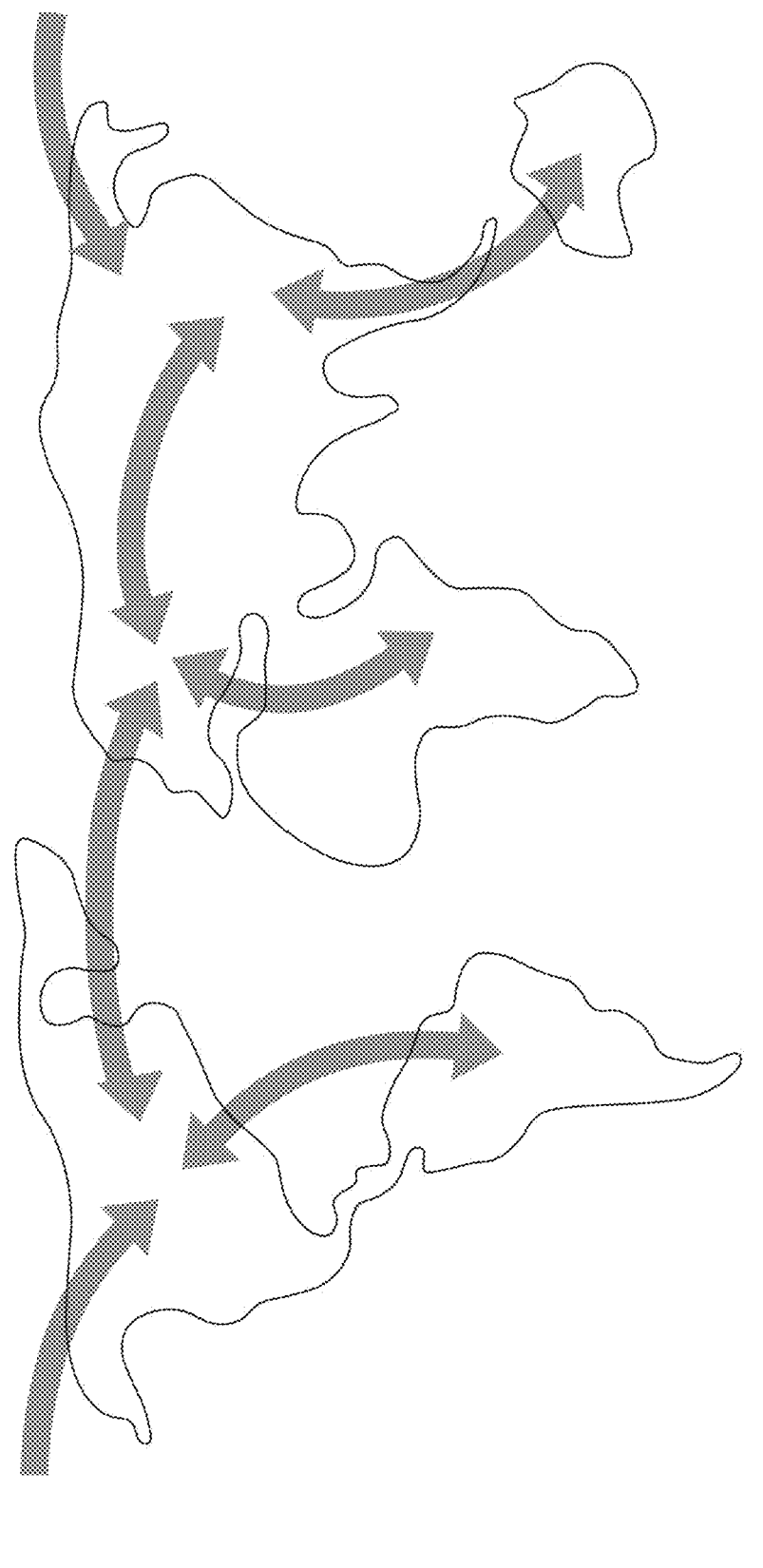

FIG. 10 schematically illustrates a global quantum key distribution network built from a plurality of clusters according to an embodiment according to an embodiment of the present disclosure.

Figure 11:
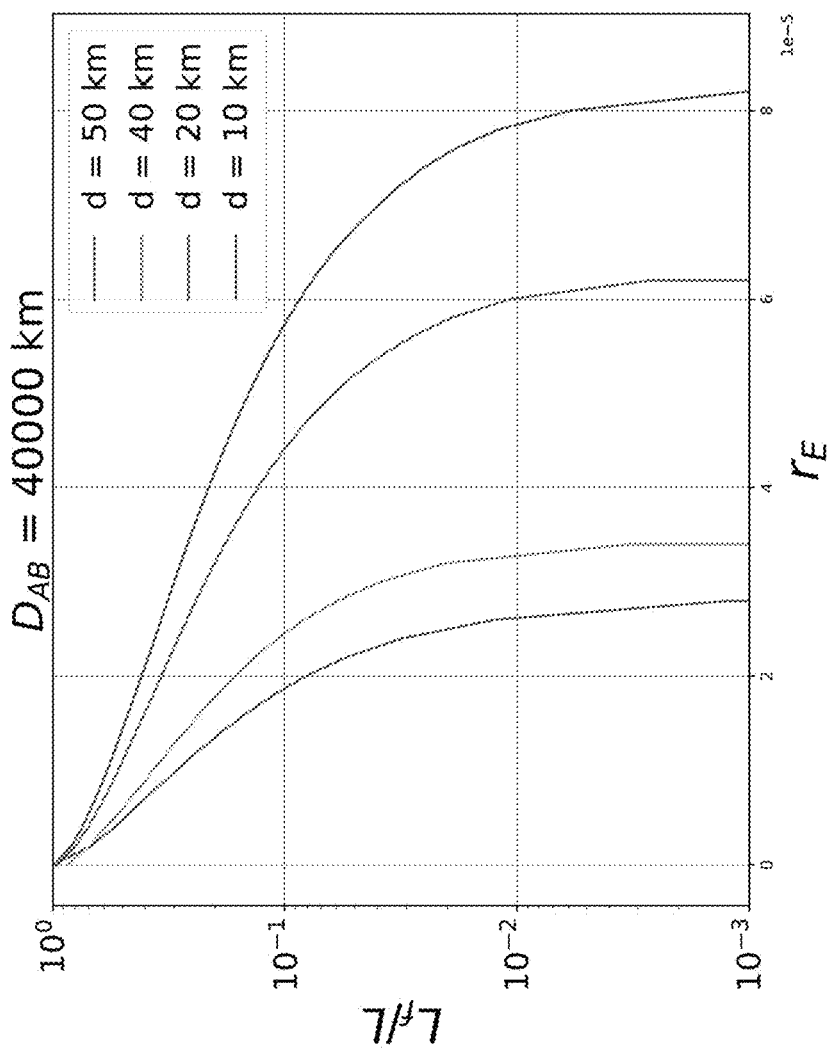

FIG. 11 illustrates the key generation rate that can be achieved across a global distance in a quantum key distribution network according to an embodiment according to an embodiment of the present disclosure.

DETAILED DESCRIPTION OF THE INVENTION

Figure 1:
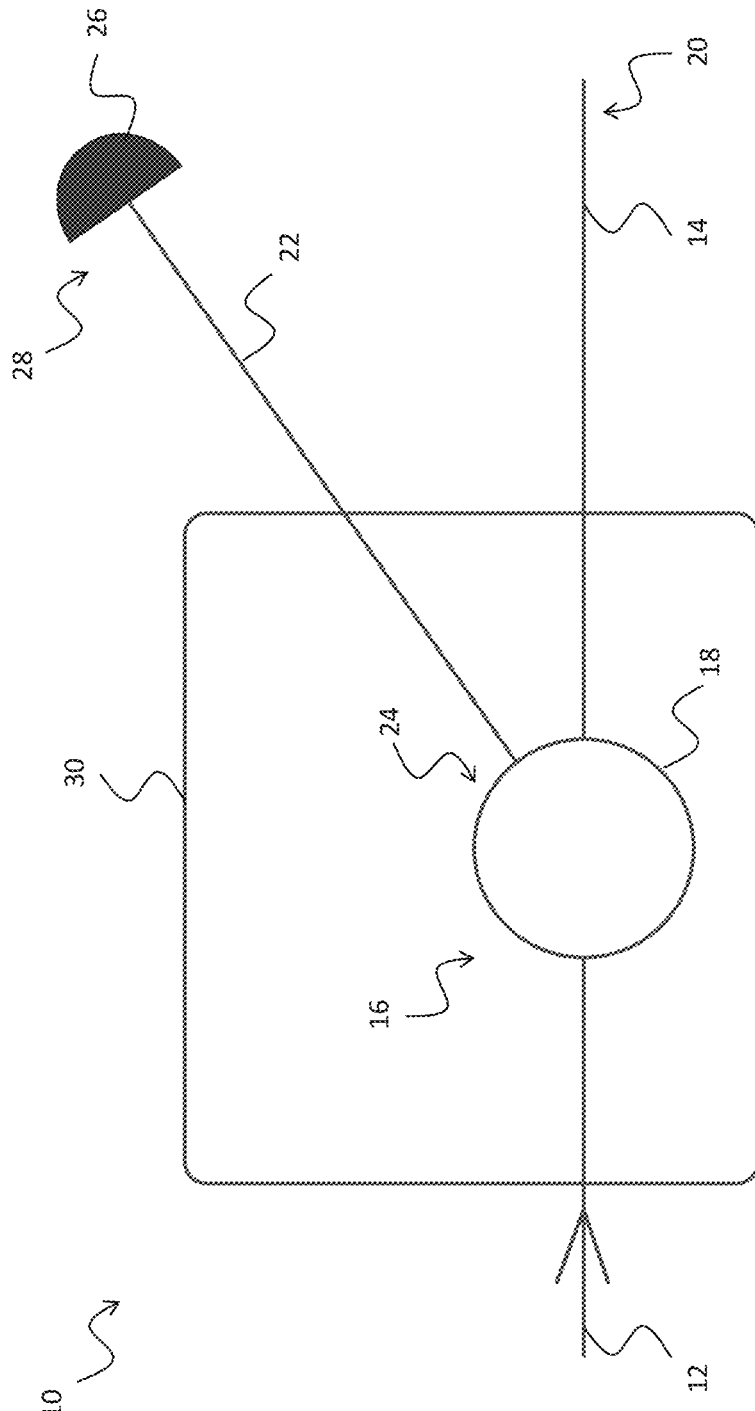
FIG. 1 is a schematic illustration of a quantum key distribution device according to an embodiment of the present disclosure.

FIG. 1 is a schematic illustration of a quantum key distribution device 10 according to an embodiment. The quantum key distribution device 10 comprises an input signal path 12 adapted to receive a plurality of optical input signals from a transmitter device (not shown), which may be connected to the quantum key distribution device 10 by means of an optical fiber channel. The quantum key distribution device 10 further comprises an output signal path 14 connected to the input signal path 12 at a first end 16 of the output signal path 14, such as at a first beam splitter 18. The output signal path 14 may be further adapted to emit a plurality of first optical output signals at a second end 20 of the output signal path 14, opposite to the first end 16.

As can be further taken from FIG. 1, the quantum key distribution device 10 additionally comprises a detector signal path 22 connected to the input signal path 12 at a third end 24 of the detector signal path 22. In the configuration shown in FIG. 1, the third end 24 of the detector signal path 22 corresponds to the first end 16 of the output signal path 14, and hence to the location of the first beam splitter 18. The first beam splitter 18 splits the input signal path 12 into the output signal path 14 and the detector signal path 22, at the first end 16 of the output signal path 14/third end 24 of the detector signal path 22.

In the architecture illustrated in FIG. 1, the input signal path 12 forms an input path of a device that can be functionally considered a Mach-Zehnder (MZ) interferometer 30, and the output signal path 14 and the detector signal path 22 form output paths of the Mach-Zehnder interferometer 30.

A photon detector device 26 is located at a fourth end 28 of the detector signal path 22, opposite to the third end 24. The photon detector device 26 is adapted to detect the optical input signals from the transmitter device, which, depending on a switch setting of the quantum key distribution device 10, or depending on a switch setting of the Mach-Zehnder interferometer 30, may arrive at the photon detector device 26 via the input signal path 12, first beam splitter 18 and detector signal path 22.

The input signal path 12, output signal path 14 and detector signal path 22 may comprise optical fibers, but in general any channel adapted to transmit optical signals may be applied in the context of the present invention, including a free space transmission link.

The labels first end 16, second end 20, third end 24, and fourth end 28 of the signal paths merely serve for notational distinction, and do not necessarily imply any order or ranking.

The quantum key distribution device 10 as illustrated in FIG. 1 is adapted to establish a shared quantum cryptographic key, such as in the form of a one-time pad, with the transmitter device based on the detected optical input signals.

Advantageously, by means of the first beam splitter 18, the quantum key distribution device 10 may be switched between a transmitting configuration, in which the optical input signals received at the input signal path 12 are transmitted through to the output signal path 14 substantially unaffected, and a receiving configuration, in which the optical signals received at the input signal path 12 are transmitted to the detector signal path 22 to be received and measured at the photodetector device 26. In the transmitting configuration, the quantum key distribution device 10 serves as a bystander device that does not (substantially) interfere with the input signals. In contrast, in the receiving configuration of the quantum key distribution device 10 the optical signals received at the input signal path 12 are intercepted and measured at the photodetector device 26, to allow the quantum key distribution device 10 to establish the shared quantum cryptographic key with the transmitter device based on the detected optical input signals, as will be described below in additional detail.

Figure 2:
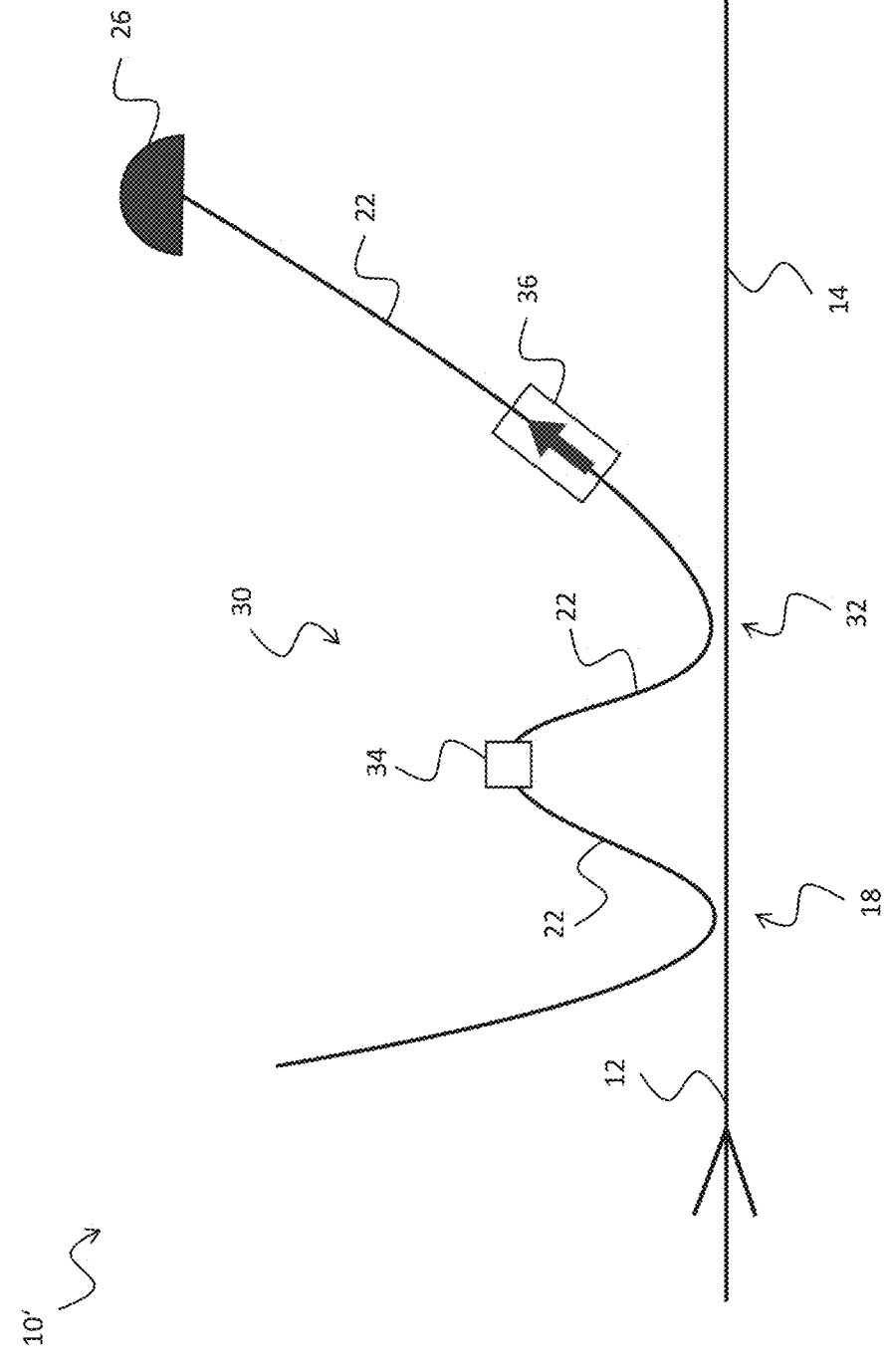
FIG. 2 is a schematic illustration of a Mach-Zehnder interferometer architecture with one phase modulator employed in a quantum key distribution device according to an embodiment according to an embodiment of the present disclosure.

FIG. 2 is a schematic illustration of a quantum key distribution device 10' implemented as a Mach-Zehnder interferometer 30, according to an embodiment. The functionality of the quantum key distribution device 10' of FIG. 2 generally corresponds to the quantum key distribution device 10 of FIG. 1, and corresponding components share the same reference numerals.

At the first beam splitter 18, which may be a 50/50 beam splitter, the input signal path 12 branches off into the output signal path 14 and the detector signal path 22. The Mach-Zehnder interferometer 30 additionally comprises a second beam splitter 32, which may be another 50/50 beam splitter that interferes the output signal path 14 again with the detector signal path 22, downstream of the first beam splitter 18. A first phase modulator 34, such as an optoelectronics phase modulator, may be located along the detector signal path 22 between the first beam splitter 18 and the second beam splitter 32. The first phase modulator 34 may be adapted to modulate the phase of an optical signal in the detector signal path 22 in response to a switch signal and may thereby vary the intensities of the optical signals in the detector signal path 22 and/or in the output signal path 14. Due to this mechanism, the first phase modulator 34 may effectively switch the Mach-Zehnder interferometer 30 between the transmitting configuration and the receiving configuration.

An optoelectronics phase modulator 34 has the advantage of permitting very low switching times, in the order of a few nanoseconds (ns), such as 0.5 ns or even 0.1 ns. These switching times compare favorably against the switching times of commercially available micro-electromechanical switches (MEMS), which are typically in the range of 0.1 to 30 ms, or optomechanical switch element with typical switching times around 1 ms.

The Mach-Zehnder interferometer 30 comprising the optoelectronics phase modulator 34 has a number of additional advantages, which make it particularly suitable for use in a quantum key distribution network. In the transmitting mode, it is marked by relatively small signal losses (at around 10% or even lower), and in the receiving mode the transmission further down the output signal path 14 can be completely blocked.

As further illustrated in FIG. 1, the detector signal path 22 may comprise an optical isolator element 36 downstream of the second beam splitter 32. The optical isolator element 36 may serve as an optical diode or one-way element (as illustrated by the arrow), and may prevent optical signals from the photodetector device 26 reaching the output signal path 14.

Let us calculate the optimal parameters of the Mach-Zehnder interferometer 30 comprising only one phase modulator 34. The passive operational modes of the Mach-Zehnder interferometer 30 depend on the phase φ imposed by the phase modulator 34: e.g., φ=π for receiving and φ=0 for transmitting. In general, the light state interacting with the Mach-Zehnder interferometer 30 can be represented as a two-dimensional vector, and an input state has a vacuum 0 on one port, and an input signal with complex amplitude α on another port corresponding to the input signal path 12. The transformation which a MZ-based switch imposes on an input state $(0, \alpha)^T$ can be written as $$\hat{U}_{MZ} = \hat{U}_2 \cdot \hat{U}_\varphi \cdot \hat{U}_1, \tag{1}$$

where $$\hat{U}_{1(2)} = \begin{pmatrix} i\sqrt{1 - T_{1(2)}} & \sqrt{T_{1(2)}} \\ \sqrt{T_{1(2)}} & i\sqrt{1 - T_{1(2)}} \end{pmatrix} \tag{2}$$

is the transformation corresponding the first beam splitter 18 and second beam splitter 32, respectively, which are characterized by their respective transmission probability $T_{1(2)}$, and $$\hat{U}_\varphi = \begin{pmatrix} e^{i\varphi - \gamma} & 0 \\ 0 & 1 \end{pmatrix} \tag{3}$$

is the transformation corresponding to a phase shift φ on the phase modulator with loss coefficient γ. For any incoming signal with amplitude α two conditions should be fulfilled:

Receiving: $\hat{U}_{MZ}(\varphi=\pi)(0,\alpha)^T=(\alpha',0)^T$,

Transmitting: $\hat{U}_{MZ}(\varphi=0)(0,\alpha)^T=(0,\alpha'')^T$, (4)

where α' and α" are the complex amplitudes of light coming out of the detector signal path 22 and output signal path 14, respectively. Rewriting these expressions, we get $$\sqrt{T_1(1-T_2)}e^{-\gamma}=\sqrt{(1-T_1)T_2},$$

$$\sqrt{T_1 T_2}e^{-\gamma}=\sqrt{(1-T_1)(1-T_2)}. \tag{5}$$

Thus, we obtain $$T_1 = \frac{1}{1 + e^{-2\gamma}} \text{ and } T_2 = \frac{1}{2}.$$

The same configuration may also be used for sending pulses. In the sending mode, the input state can be represented as $(\beta, 0)^T$, and the output is $$\hat{U}_{MZ}(\phi)(\beta,0)^T=(\beta',\beta'')^T, \tag{6}$$

where β' denotes an arbitrary component that propagates in the detector signal path 22 and ends up in the photon detector device 26, and the pulse with the amplitude β" goes down the output signal path 14 and thus constitutes a signal. From the same equations, we obtain $$\beta'' = \beta \cdot \frac{ie^{-\gamma}}{\sqrt{2(1 + e^{-2\gamma})}}(e^{i\phi - \gamma} + 1). \tag{7}$$

Therefore, non-zero γ imposes bounds on the possible signal intensity I:

$$I_0 \cdot (1+e^{-\gamma})^2 > I > I_0 \cdot (1-e^{-\gamma})^2, \tag{8}$$

where $I_0$ is determined by the intensity of the modulated input light.

The signals in the optical fiber may be deteriorated by polarization and phase fluctuations. For the proper operation of the MZ-switch these fluctuations may be compensated through continuous signal tuning. The input signal can be tuned with, for instance, high speed 3-paddle polarization controllers. Such a tuning can take place during the line control subroutine of a QKD protocol performed with high intensity test pulses. For better efficacy, the switch itself may be assembled with the polarization maintaining fiber instead of the regular single mode fiber. The phase difference fluctuations in the MZ-switch itself can be controlled with the phase modulator 34 at a frequency much lower than the operational frequency for the information transmitting.

The Mach-Zehnder architecture described above with reference to FIG. 2 permits to switch the operation mode of the quantum key distribution device 10, 10' between the receiving mode and the transmitting mode by means of the first phase modulator 34, and hence is fully sufficient for operating a quantum key distribution device 10, 10' whose role is chiefly to receive signals, but should not necessarily be adapted to send signals into the quantum key distribution network. However, in some configurations it may be advantageous to provide a Mach-Zehnder architecture that is also specifically adapted for sending optical signals into the quantum key distribution network, and hence may serve as combined receiver/transmitter device in the quantum key distribution network.

A quantum key distribution network may comprise one or more quantum key distribution devices that operate chiefly or exclusively as receiver devices, and one or more quantum key distribution devices that work as combined receiver/transmitter devices.

In some configurations, a central control node or management node (not shown) in the quantum key distribution network may designate the functionality of different quantum key distribution devices in the quantum key distribution network. In particular, the central control node or management node may be connected to a plurality of different quantum key distribution devices in the network, and may set operational settings of the plurality of different quantum key distribution devices so that the plurality of different quantum key distribution devices selectively work as a receiver device, or as a combined receiver/transmitter device.

Figure 3:
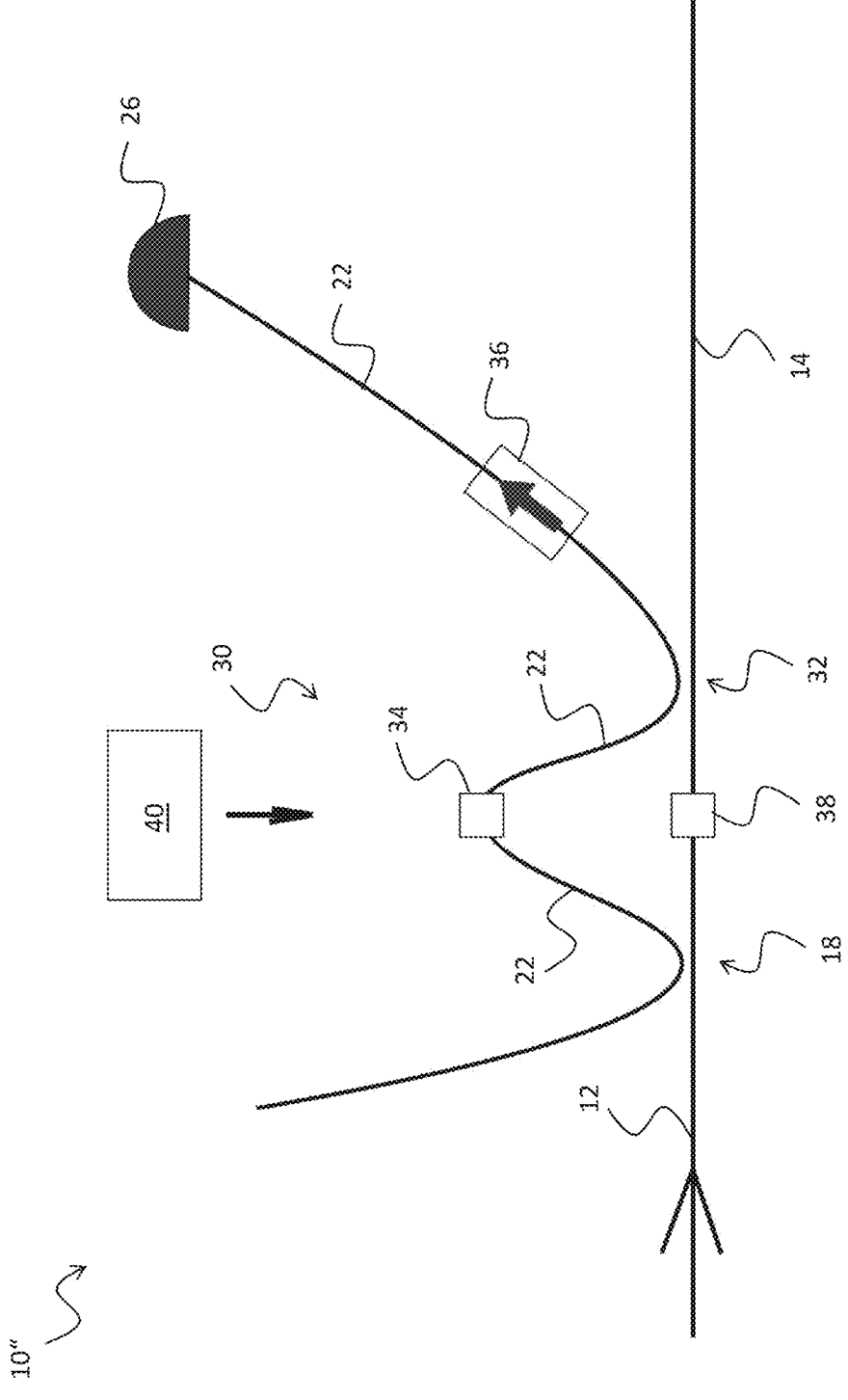
FIG. 3 is a schematic illustration of another Mach-Zehnder interferometer architecture with two phase modulators employed in a quantum key distribution device according to an embodiment according to an embodiment of the present disclosure.

FIG. 3 is a schematic illustration of another quantum key distribution device 10″ that generally corresponds to the quantum key distribution device 10′ described above with reference to FIG. 2, and corresponding elements share the same reference numerals. However, the quantum key distribution device 10″ additionally comprises a second phase modulator 38 in the output signal path 14 in between the first beam splitter 18 and the second beam splitter 32. The second phase modulator 38 may generally correspond in design and functionality to the first phase modulator 34 described above with reference to FIG. 2. When employed in conjunction, the first phase modulator 34 and the second phase modulator 38 may adjust the signal intensities in the output signal path 14 and in the detector signal path 22 to arbitrary signal levels, without any limitation on the minimum signal intensities.

As further shown in FIG. 3, the quantum key distribution device 10″ additionally comprises a random number generator, such as a quantum random number generator 40, that is operatively coupled to the first phase modulator 34 and/or to the second phase modulator 38. When compared with the configuration of FIG. 2, the architecture illustrated in FIG. 3 provides greater flexibility for generating optical signals, and for feeding them into the output signal path 14, but this may come at the expense of higher signal losses.

The quantum key distribution devices 10, 10′, 10″ illustrated above with reference to FIG. 1 to FIG. 3 allow to selectively switch with high-speed and high reliability between a transmitting mode, in which optical signals received on the input signal path 12 from the transmitter device (not shown) are transmitted substantially undistorted into the output signal path 14, and a receiving mode in which the optical signals received on the input signal path 12 are diverted into the detector signal path 22, and are detected by means of the photon detector device 26. In the receiving mode, the quantum key distribution devices 10, 10′, 10″ allow to establish a shared quantum cryptographic key with the transmitter device based on the detected optical input signals. To this end, the respective quantum key distribution device 10, 10′, 10″ may be additionally connected to the transmitter device via a classical information channel to provide communication for performing information reconciliation and privacy amplification.

The photon detector device 26 may be adapted to perform intensity measurements of the received optical signals, but in other examples, homodyne detection or phase ciphering may likewise be employed. In general, any quantum key distribution protocol can be employed in the context of the present disclosure to establish a cryptographic key between the transmitter device and the respective quantum key distribution device 10, 10′, 10″. In particular, the protocols may take into account the physical loss control along the transmission lines, as described in N. S. Kirsanov et. al., arXiv: 2105.00035v1, which may advantageously lead to particularly high key generation rates even over very large distances in the range of thousands of kilometers.

FIG. 4 is a flow diagram that illustrates a quantum key distribution method according to an embodiment. In a first step S10, a plurality of optical input signals are received from a transmitter device. In a second step S12, the received optical input signals are selectively transmitted through a Mach-Zehnder interferometer and channeled either into an output signal path, or into a detector signal path, wherein the detector signal path comprises a photon detector device. In case the received optical input signals are transmitted into the detector signal path, the optical input signals from the transmitter device are detected in the detector signal path by means of the photon detector device, in a third step S14. In a fourth step S16, a shared quantum cryptographic key is established with the transmitter device based on the detected optical input signals.

The techniques of the present disclosure have been described above with reference to FIGS. 1 to 4 with reference to a single quantum key distribution device 10, 10′, 10″. However, it is a particular advantage of the techniques of the present disclosure that they may be advantageously employed for building larger quantum key distribution networks out of individual building blocks, which may allow any-to-any communication to establish shared cryptographic keys between any two such building blocks in the quantum key distribution network.

Figure 5:
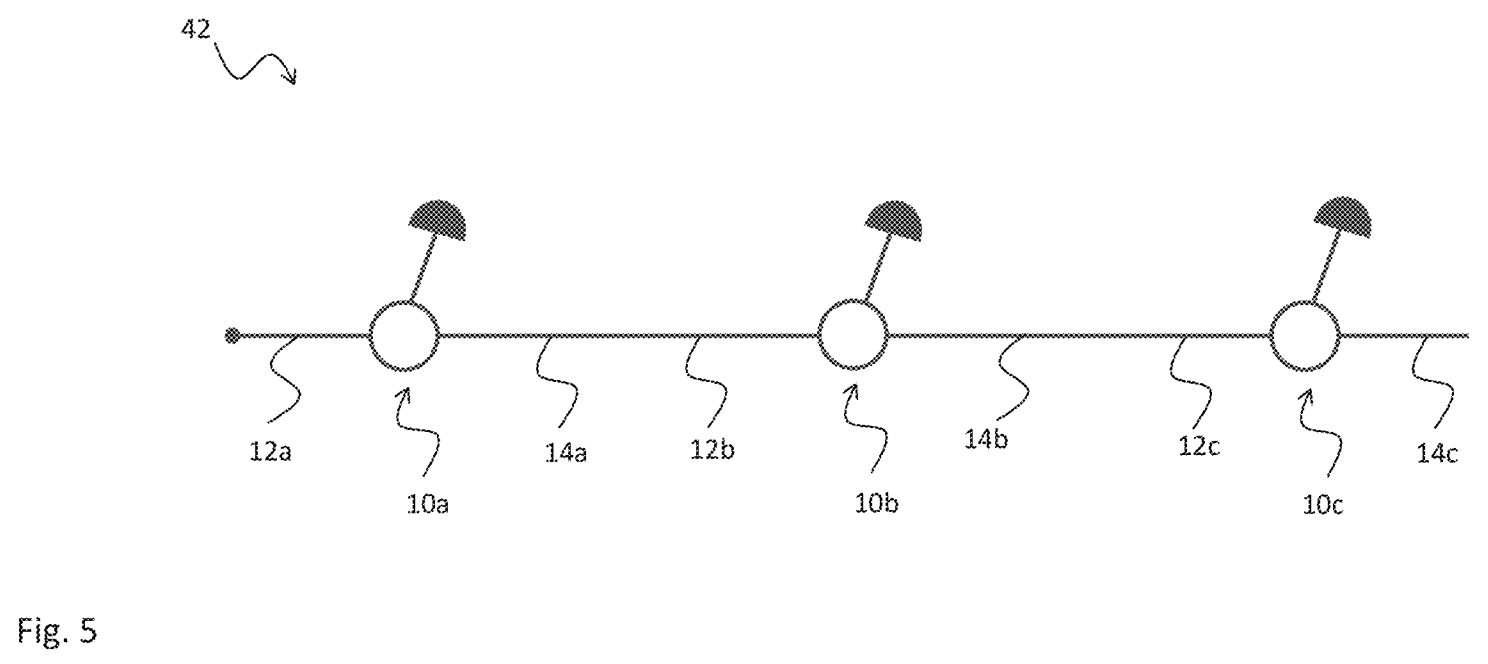

FIG. 5 is a schematic illustration of a quantum key distribution network 42 in which the techniques of the present disclosure may be employed. The quantum key distribution network 42 of FIG. 5 comprises a plurality of quantum key distribution devices 10a, 10b, 10c, wherein each of the quantum key distribution devices 10a, 10b, 10c may correspond to one of the configurations described above with reference to FIGS. 1 to 4. Hence, corresponding reference numerals are employed to denote corresponding elements. In particular, the reference numerals 12a, 12b, 12c denote the respective input signal paths, and the reference numerals 14a, 14b, 14c denote the respective output signal paths of the quantum key distribution devices 10a, 10b, 10c.

As can be taken from FIG. 5, in the quantum key distribution network 42 an output signal path 14a of the first quantum key distribution device 10a is connected to or coincides with an input signal path 12b of the second quantum key distribution device 10b. Similarly, an output signal path 14b of the second quantum key distribution device 10b is connected to or coincides with an input signal path 12c of the third quantum key distribution device 10c.

For instance, in an operational mode of the quantum key distribution network 42 illustrated in FIG. 5, the first quantum key distribution device 10a may serve as a transmitter device, and may emit optical signals into the output signal path 14a. In case a secure cryptographic key shall be established with the second quantum key distribution device 10b, the second quantum key distribution device 10b may be instructed to operate in the receiving mode, such as by means of a switch signal that triggers a corresponding setting of a phase modulator of the second quantum key distribution device 10b, as described above with reference to FIGS. 1 to 4. The second quantum key distribution device 10b may receive the switch signal from a user of the second quantum key distribution device 10b, or from a central control or management node (not shown) in the quantum key distribution network 42.

In the receiving mode of the second quantum key distribution device 10b, all optical signals received on the input signal path 12*b* end up in the detector signal path of the second quantum key distribution device 10*b*, and thus the third quantum key distribution device 10*c* will not learn anything about the established key.

Alternatively, in case a secure cryptographic key shall be established between the first quantum key distribution device 10*a* and the third quantum key distribution device 10*c*, the second quantum key distribution device 10*b* may be triggered by the switch signal to operate in the transmitting mode, such as by changing the operational phase of the phase modulator 34. In this configuration, the second quantum key distribution device 10*b* may transmit the optical signals received from the first quantum key distribution device 10*a* at the second input signal path 12*b* (substantially) undistorted into the second output signal path 14*b*, towards the third quantum key distribution device 10*c*, which operates in the receiving mode. In this configuration, the second quantum key distribution device 10*b* serves as an intermediate node or innocent bystander, and does not learn anything about the cryptographic key establish between the first quantum key distribution device 10*a* and the third quantum key distribution device 10*c*. In case the second quantum key distribution device 10*b* were to eavesdrop on the communication, the quantum key distribution protocols would allow this to be detected at the first quantum key distribution device 10*a* and the third quantum key distribution device 10*c*.

FIG. 5 shows a configuration with three quantum key distribution devices 10*a*, 10*b*, 10*c* connected in series, but this is for ease of description only, and in general a quantum key distribution network may employ any integer number of quantum key distribution devices, which may be connected in different topologies. In some embodiments, the signal lines connecting the quantum key distribution devices in the network may be equipped with a cascade of optical amplifiers serving as quantum repeaters, so to extend the transmission distance and/or enhance the quantum key generation rate. In addition, all the quantum key distribution devices in the network may be connected by means of a classical authenticated network, such as to facilitate privacy amplification and information reconciliation.

Let us estimate the number (N) of users with the MZ-based switches that can be successively arranged in a quantum key distribution network—with the first and the last users still being able to communicate. The analysis of N. S. Kirsanov et. al., arXiv: 2105.00035v1 shows that in the case of only two users, a QKD protocol can operate with the transmission distance D=40,000 km. However, adding users to the network further attenuates signals due to the losses on their switches. Thus, the maximum transmission distance drops. To estimate the possible number of users, let us consider that the distance between two neighbours is a=1 km. If the transmission probability of one switch is $T_s$=0.8 (realistic in the case of the MZ-switch with one phase modulator, such as in the configuration of FIG. 2), then effectively the distance between neighbours is $$a_{eff} = a - \frac{\log T_s}{\mu}, \text{ where } \mu \approx \frac{1}{50 \text{ km}}$$

is the coefficient describing the natural scattering losses in the fiber (the signal intensity, decreasing with distance x, is $\propto e^{\mu x}$). To estimate N, we equate the total effective line length to the maximum transmission distance D:

$$(N-1)a_{eff}=D. \tag{9}$$

Substituting the numbers we find that N~10,000. With a network structure more sophisticated than the linear one of FIG. 5, this number may even be increased further.

FIG. 6 schematically illustrates a quantum key distribution network 42' that generally corresponds in functionality and design to the quantum key distribution network 42 described above with reference to FIG. 5, and corresponding components share the same reference numerals. However, in the configuration of FIG. 6 the quantum key distribution devices 10*a*, 10*b*, 10*c* are arranged in a ring topology, and hence the output signal path 14*c* of the last (in this case third) quantum key distribution device 10*c* coincides with or is connected to the input signal path 12*a* of the first quantum key distribution device 10*a*. Different rings may be interconnected by means of optical switches 44, as further illustrated in FIG. 6. This may allow to additionally extend the reach of the quantum key distribution network 42'.

Based on the techniques described above with reference to FIGS. 1 to 5, quantum cryptographic keys may be exchanged between any two quantum key distribution devices in the quantum key distribution network 42', if the length of the ring sector between the sending node and the receiving node does not exceed the transmission distance limit of the QKD protocol. The (to some extent inevitable) intensity losses may be compensated with a cascade of optical amplifiers (not shown) serving as quantum repeaters. While the ring structure is relatively simple in construction, average communication in such a cluster involves many users and is marked by relatively large transmission distances. This may increase the risk of unexpected losses on the communication lines.

The quantum key distribution between different pairs of quantum key distribution devices within the quantum key distribution network 42, 42' may require some logical organization, such as in the form of the central control node or management node. However, within that protocol the quantum key generation can be completely decentralized. Given that the intended sender and receiver able to control the transmission by themselves, they do not need any help of a third party in the quantum key generation, which is an advantage over quantum key distribution networks that rely on trusted intermediaries.

A possible operation protocol may be based on the first in, first out (FIFO) method, as will now be described in greater detail with reference to the quantum key distribution network 42' of FIG. 7, which shows another ring topology with six quantum key distribution devices 10*a* to 10*f*. Let us assume that quantum cryptographic keys shall be established between the quantum key distribution devices 10*a* and 10*c* on the one hand, and between the quantum key distribution devices 10*d* and 10*e* on the other hand (as illustrated by the arrows in FIG. 7). The respective communication paths do not overlap, and hence the quantum key generation may proceed in parallel and simultaneously, without any interference. If, however, quantum cryptographic keys shall be established between the quantum key distribution devices 10*a* and 10*c* on the one hand, and the quantum key distribution devices 10*f* and 10*b* on the other hand, the respective signal paths overlap, and time multiplexing techniques may be employed to avoid any interference.

FIG. 8*a* shows a quantum key distribution network 42" with a two-dimensional lattice topology, wherein each of the lattice nodes 46*a* to 46*p* may comprise at least one quantum key distribution device, such as any of the quantum key distribution devices 10, 10', described above with reference to FIGS. 1 to 7. FIG. 8*a* shows a lattice with 16 lattice nodes 46a to 46p, but in general a quantum key distribution network 42" may comprise any number of lattice nodes.

Compared with the ring topologies of FIGS. 6 and 7, the quantum key distribution network 42" with the two-dimensional lattice topology is characterized by a larger number of signal links between any two quantum key distribution devices, and in addition may allow to establish alternative paths between different quantum key distribution devices. This reduces the average transmission distance, and at the same time enhances the reliability and resilience of the quantum key distribution network 42". Again, techniques of time multiplexing may be employed in case of overlapping signal paths between any of the lattice nodes 46a to 46p.

FIG. 8b is a schematic illustration of a lattice node of a quantum key distribution network with a lattice topology, such as the lattice node 46g of the quantum key distribution network 42" that has been described above with reference to FIG. 8a.

In the example shown in FIG. 8b, the lattice node 46g comprises four quantum key distribution devices 10a to 10d arranged in a ring topology, where any of the quantum key distribution devices 10a to 10d may correspond to one of the quantum key distribution devices 10, 10', 10" described above with reference to FIGS. 1 to 5. In this configuration, a high flexibility and redundancy can be achieved, and optical signals for quantum key distribution may be exchanged with any of the neighboring nodes, possibly in any direction.

To further extend the geographical range of the key generation, several quantum key distribution networks may be combined into larger cluster networks. FIG. 9 shows a cluster network 48 with a plurality of clusters 50a to 50f, where each of the clusters 50a to may comprise one or more of the quantum key distribution networks 42, 42', 42" described above with reference to FIGS. 6 to 8b. The different clusters 50a to 50f may be connected by optical highway lines 52a to 52h, which may be optical fiber links that comprise no or only few nodes and may span distances of up to 5,000 km or more while still providing high signal rates. Possibly, almost any two clusters 50a to 50f may be directly connected, in which case the number of optical highway lines 52a to 52h scales quadratically with the number of clusters 50a to 50f As schematically illustrated in FIG. 10, these techniques may be employed to build a quantum key distribution network 54 spanning the entire globe.

The quantum key rates that may be obtained in the quantum key distribution networks according to the present disclosure may be estimated by employing the techniques of N. S. Kirsanov et. al., arXiv: 2105.00035v1. FIG. 11 shows the key generation rate Lf/L over a global communication distance of 40,000 km as a function of the signal leakage rE along the transmission path, for different values of the distance d between quantum repeaters in the signal path (d=50 km, d=40 km, d=20 km, d=10 km, from bottom to top). Noticeably, the more amplifiers are installed, the higher the key generation rate that may be obtained. FIG. 11 shows that high quantum key generation rates can still be achieved for leakage values rE in the practically relevant range of $10^{-5}$ or higher.

The description of the specific embodiments and the drawings merely serve to illustrate the techniques of the present disclosure but should not be understood to imply any limitation. The scope of the disclosure is to be determined from the appended claims.

According to an embodiment, the quantum key distribution device comprises a first beam splitter adapted to connect the input signal path to the output signal path at the first end, and to the detector signal path at the third end.

Alternatively, or additionally, the quantum key distribution device may comprise a second beam splitter adapted to connect the output signal path and the detector signal path, in particular downstream of the first beam splitter.

The first beam splitter and/or the second beam splitter may be 50/50 beam splitters.

According to an embodiment, the quantum key distribution device may be adapted to transmit the optical input signals through the output signal path in a first configuration setting of the quantum key distribution device, to transmit the optical input signals through the output signal pass substantially unaffected.

The first configuration setting may correspond to a transmitting mode in which the quantum key distribution device serves as a bystander, and the optical input signals are transmitted substantially unaffected to another quantum key distribution device in the quantum key distribution network.

According to an embodiment, the quantum key distribution device may be adapted to transmit the optical input signals through to the output signal path in the first configuration setting of the quantum key distribution device with a probability p, wherein p is no smaller than 0.7, and in particular no smaller than 0.8 or no smaller than 0.9.

Further, the quantum key distribution device may be adapted to transmit the optical input signals to the detector signal path in a second configuration setting of the quantum key distribution device, the second configuration setting being different from the first configuration setting.

The second configuration setting may correspond to a receiving mode in which the optical signals that are received from the transmitter device are detected by means of the photodetector device, whereby a quantum cryptographic key can be established with the transmitter device based on the detected optical input signals.

In an embodiment, the quantum key distribution device, and in particular the Mach-Zehnder interferometer, may be adapted to switch between the first configuration setting and the second configuration setting, in particular in response to a received switch signal.

In the context of the present disclosure, the switch signal may denote a classical signal received from another quantum key distribution device in the quantum key distribution network, or from a central management node of the quantum key distribution network.

It is an advantage of the present disclosure that the Mach-Zehnder interferometer allows for a quick and efficient configuration switching between the first configuration, in which the optical input signals are transmitted, and the second configuration, in which the signals are detected.

According to an embodiment, the quantum key distribution device may comprise a first phase modulator device in the detector signal path, wherein the first phase modulator is adapted to modulate a phase of an optical signal in the detector signal path and/or to modulate an intensity of an optical signal in the detector signal path and/or to form an optical signal in the output signal path and/or to modulate an intensity of an optical signal in the output signal path.

In particular, the first phase modulator device may be located between the first beam splitter and the second beam splitter.

The first phase modulator device may modulate the phase of the optical signal in the detector signal path before the second beam splitter. The phase modulation may lead to a change of intensity in the detector signal path and/or in the output signal path after the second beam splitter.

The first phase modulator device may be adapted to adjust a signal intensity in the detector signal path and/or a signal intensity in the output signal path, depending on a phase setting of the first phase modulator device.

According to an embodiment, the first phase modulator device may be adapted to switch between the first configuration setting and the second configuration setting, in particular in response to the received switch signal.

In some instances, a single-phase modulator device may be sufficient in the quantum key distribution device according to the present disclosure. However, in set-ups with only a single-phase modulator device some limitations on the signal intensity range may apply, as will be described in further detail below.

According to an embodiment, the quantum key distribution device comprises a second phase modulator device in the output signal path, wherein the second phase modulator device is adapted to modulate a phase of an optical signal in the output signal path and/or to modulate an intensity of an optical signal in the output signal path and/or to form an optical signal in the output signal path and/or to modulate an intensity of an optical signal in the detector signal path.

In particular, the second phase modulator device may be located between the first beam splitter and the second beam splitter.

The second phase modulator device may alleviate restrictions on the signal intensity range that may apply in quantum key distribution devices with only a single-phase modulator device. In particular, the second phase modulator device may allow the quantum key distribution device to emit optical signals of arbitrarily small intensities into the output signal path.

The second phase modulator device may correspond in design and functionality to the first phase modulator device. According to an embodiment, the first phase modulator device and/or the second phase modulator device comprises an optoelectronic phase modulator.

It is an advantage of the techniques of the present disclosure that the first phase modulator device and/or the second phase modulator device allows for very fast switching, on the order of a few nanoseconds or even less.

According to an embodiment, a switching speed of the first phase modulator device and/or the second phase modulator device is no larger than 5 ns, in particular no larger than 3 ns, or no larger than 2 ns, or no larger than 1 ns, or no larger than 0.5 ns, or no larger than 0.2 ns, or no larger than 0.1 ns.

According to an embodiment, the quantum key distribution device further comprises a photon source adapted to emit optical signals into the output signal path.

By means of the photon source, the quantum key distribution device may serve as a transmitter device adapted to transmit optical signals within the quantum key distribution network, such as for establishing a quantum cryptographic key with a receiver device in the network.

According to an embodiment, the quantum key distribution device further comprises a random number generator, in particular a quantum random number generator. The random number generator, in particular the quantum random number generator, may be connected to the detector signal path, and in particular connected to the first phase modulator device.

The random number generator, in particular the quantum random number generator, may govern an operation of the first phase modulator device and/or an operation of the second phase modulator device.

The random number generator, in particular the quantum random number generator, may allow the quantum key distribution device to generate optical signals randomly, such as for establishing a secure cryptographic key with another device within the quantum key distribution network for secure communication and/or authentication, such as by means of a symmetric encryption-based method, for instance by means of a one-time pad.

According to an embodiment, the quantum key distribution device may be additionally connected to the transmitter device by means of a classical information channel. In particular, the quantum key distribution device may be adapted to establish a shared bit sequence and to perform privacy amplification with the transmitter device, in particular via the classical information channel.

Establishing the shared bit sequence may involve a post-selection of measurement results and/or an error correction process.

In the description as detailed above, the techniques of the present disclosure have been described mostly with reference to a single quantum key distribution device. However, the disclosure is not so limited, and in a second aspect also refers to a quantum key distribution network comprising a plurality of interconnected quantum key distribution devices with some or all of the features described above.

According to the second aspect, the transmitter device as described above with reference to the first aspect may be a first quantum key distribution device among the plurality of quantum key distribution devices, and an output signal path of a first quantum key distribution device among the plurality of quantum key distribution devices may be connected to an input signal path of a second quantum key distribution device among the plurality of quantum key distribution devices. The second quantum key distribution device may be adapted establish a shared quantum cryptographic key with the first quantum key distribution device based on the detected optical input signals.

Advantageously, the quantum key distribution network according to the present disclosure may allow the reliable exchange of quantum cryptographic keys between a plurality of entities distributed across different and spatially remote geographic locations, and with high key rates.

According to an embodiment, the plurality of quantum key distribution devices may be arranged in a ring topology.

The ring topology may refer to the network topology, as it may be defined by the connection to neighboring nodes but may not necessarily correspond to the geographical locations of the respective quantum key distribution devices in the network.

According to an embodiment, the ring topology may comprise n quantum key distribution devices, n being any integer number no smaller than 2, wherein the n quantum key distribution devices may be arranged in the ring in the order from 1 to n. An output signal path of the n-th quantum key distribution device of the ring topology may be connected to the input signal path of the first quantum key distribution device of the ring topology.

According to another embodiment, the plurality of quantum key distribution devices may be arranged in a lattice topology.

Again, the lattice topology may refer to the network topology, as it may be defined by the connection to neighboring nodes and may not necessarily correspond to the geographical locations of the quantum key distribution devices in the network.

The lattice may comprise a plurality of lattice nodes, where neighboring lattice nodes may be connected to each other by means of optical signal lines.

According to an embodiment, a plurality of lattice nodes, and in particular each lattice node, may comprise a plurality of m Mach-Zehnder interferometers in a ring topology, wherein m may be any positive integer no smaller than 2, in particular m=4.

Topologies different from the ring topology or the lattice topology may likewise be employed in the context of the present disclosure.

In some embodiments, the ring topology and/or the lattice topology may represent the topology of a single user cluster. Several separate clusters may be interconnected by means of optical highway lines.

In a third aspect, the disclosure relates to a quantum key distribution method, comprising the steps of receiving a plurality of optical input signals from a transmitter device, and selectively transmitting the received optical input signals through a Mach-Zehnder interferometer into an output signal path, or into a detector signal path, wherein the detector signal path comprises a photon detector device.

If the received optical input signals are transmitted into the detector signal path, the method further comprises detecting the optical input signals from the transmitter device in the detector signal path by means of the photon detector device and establishing a shared quantum cryptographic key with the transmitter device based on the detected optical input signals.

According to an embodiment, the Mach-Zehnder interferometer is a Mach-Zehnder interferometer with some, or all of the features described above with reference to the first aspect and/or the second aspect of the disclosure.

In an embodiment, the optical input signals are transmitted through the Mach-Zehnder interferometer into the output signal path substantially unaffected.

According to an embodiment, the optical input signals may be transmitted through the Mach-Zehnder interferometer into the output signal path with a probability p, wherein p is no smaller than 0.7, and in particular no smaller than 0.8, or no smaller than 0.9.

In an embodiment, the received optical input signals are transmitted through the Mach-Zehnder interferometer in response to a received switch signal.

According to an embodiment, the method further comprises modulating a phase of an optical signal in the detector signal path and/or modulating an intensity of an optical signal in the detector signal path and/or forming an optical signal in the output signal path and/or modulating an intensity of an optical signal in the output signal path, in particular by means of a first phase modulator device, such as a first phase modulator device in the detector signal path.

According to an embodiment, the method further comprises modulating a phase of an optical signal in the output signal path and/or modulating an intensity of an optical signal in the output signal path and/or forming an optical signal in the output signal path and/or modulating an intensity of an optical signal in the detector signal path, in particular by means of a second phase modulator device, such as a second phase modulator device in the output signal path.

The second phase modulator device may correspond in design and functionality to the first phase modulator device.

In an embodiment, the method further comprises emitting optical signals into the output signal path, such as by means of a controlled photon source.

According to an embodiment, establishing the shared quantum cryptographic key with the transmitter device comprises establishing a shared bit sequence and performing privacy amplification with the transmitter device, in particular via a classical information channel.

Establishing the shared bit sequence may involve a post-selection of measurement results and/or an error correction process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A quantum key distribution device, comprising:
an input signal path adapted to receive a plurality of optical input signals from a transmitter device;
an output signal path connected to the input signal path at a first end and adapted to emit a plurality of first optical output signals at a second end opposite to the first end;
a detector signal path connected to the input signal path at a third end and comprising a photon detector device at a fourth end opposite to the third end; and
wherein the photon detector device is adapted to detect the optical input signals from the transmitter device,
wherein the quantum key distribution device is adapted to establish a shared quantum cryptographic key with the transmitter device based on the detected optical input signals; and wherein the input signal path forms an input path of a Mach-Zehnder interferometer, and wherein the output signal path and the detector signal path form output paths of the Mach-Zehnder interferometer, the quantum key distribution device further comprising a first phase modulator device in the detector signal path, the first phase modulator device comprising an opto-electronic phase modulator, wherein the first phase modulator is adapted to modulate a phase of an optical signal in the detector signal path and/or to modulate an intensity of an optical signal in the detector signal path and/or to form an optical signal in the output signal path and/or to modulate an intensity of an optical signal in the output signal path, and/or, the quantum key distribution device further comprising a second phase modulator device in the detector signal path, the second phase modulator device comprising an optoelectronic phase modulator, wherein the second phase modulator device is adapted to modulate a phase of an optical signal in the output signal path and/or to modulate an intensity of an optical signal in the output signal path and/or to form an optical signal in the output signal path and/or to modulate an intensity of an optical signal in the detector signal path;

wherein a switching speed of the first phase modulator device and/or the second phase modulator device is no larger than 5 ns.

2. The quantum key distribution device of claim 1, wherein the quantum key distribution device is adapted to transmit the optical input signals through the output signal path in a first configuration setting of the quantum key distribution device, to transmit the optical input signals through the output signal path unaffected, and wherein the quantum key distribution device is adapted to transmit the optical input signals to the detector signal path in a second configuration setting of the quantum key distribution device, the second configuration setting being different from the first configuration setting.

3. The quantum key distribution device of claim 1, wherein a switching speed of the first phase modulator device and/or the second phase modulator device is no larger than one of: 1 ns, or 0.5 ns.

4. The quantum key distribution device according to claim 1, further comprising a photon source adapted to emit optical signals into the output signal path.

5. A quantum key distribution network comprising:

a plurality of interconnected quantum key distribution devices, each comprising:

an input signal path adapted to receive a plurality of optical input signals from a transmitter device;

an output signal path connected to the input signal path at a first end and adapted to emit a plurality of first optical output signals at a second end opposite to the first end;

a detector signal path connected to the input signal path at a third end and comprising a photon detector device at a fourth end opposite to the third end; and wherein the photon detector device is adapted to detect the optical input signals from the transmitter device, wherein the quantum key distribution device is adapted to establish a shared quantum cryptographic key with the transmitter device based on the detected optical input signals;

wherein the input signal path forms an input path of a Mach-Zehnder interferometer, wherein the output signal path and the detector signal path form output paths of the Mach-Zehnder interferometer;

the quantum key distribution device further comprising a first phase modulator device in the detector signal path, the first phase modulator device comprising an opto-electronic phase modulator, wherein the first phase modulator is adapted to modulate a phase of an optical signal in the detector signal path and/or to modulate an intensity of an optical signal in the detector signal path and/or to form an optical signal in the output signal path and/or to modulate an intensity of an optical signal in the output signal path, and/or, the quantum key distribution device further comprising a second phase modulator device in the detector signal path, the second phase modulator device comprising an optoelectronic phase modulator, wherein the second phase modulator device is adapted to modulate a phase of an optical signal in the output signal path and/or to modulate an intensity of an optical signal in the output signal path and/or to form an optical signal in the output signal path and/or to modulate an intensity of an optical signal in the detector signal path;

wherein a switching speed of the first phase modulator device and/or the second phase modulator device is no larger than 5 ns, wherein the transmitter device is a first quantum key distribution device among the plurality of quantum key distribution devices, and an output signal path of the first quantum key distribution device among the plurality of quantum key distribution devices is connected to an input signal path of a second quantum key distribution device among the plurality of quantum key distribution devices; and wherein the second quantum key distribution device is adapted to establish a shared quantum cryptographic key with the first quantum key distribution device based on the detected optical input signals.

6. The quantum key distribution network according to claim 5, wherein the plurality of quantum key distribution devices is arranged in a ring topology.

7. The quantum key distribution network according to claim 5, wherein the plurality of quantum key distribution devices is arranged in a lattice topology.

8. A quantum key distribution method, comprising:

receiving a plurality of optical input signals from a transmitter device; and selectively transmitting the received optical input signals through a Mach-Zehnder interferometer into an output signal path, or into a detector signal path, wherein the detector signal path comprises a photon detector device;

wherein the selectively transmitting the received optical input signals through the Mac-Zehnder interferometer comprises:

modulating a phase of an optical signal in the detector signal path and/or modulating an intensity of an optical signal in the detector signal path and/or forming an optical signal in the output signal path and/or modulating an intensity of an optical signal in the output signal path by means of a first phase modulator device comprising an optoelectronic phase modulator; and/or modulating a phase of an optical signal in the output signal path and/or modulating an intensity of an optical signal in the output signal path and/or forming an optical signal in the output signal path and/or modulating an intensity of an optical signal in the detector signal path by means of a second phase modulator device comprising an optoelectronic phase modulator;

wherein a switching speed of the first phase modulator device and/or the second phase modulator device is no larger than 5 ns;

when the received optical input signals are transmitted into the detector signal path, the method further comprises:

detecting the optical input signals from the transmitter device in the detector signal path by utilizing the photon detector device; and establishing a shared quantum cryptographic key with the transmitter device based on the detected optical input signals.

9. The quantum key distribution method according to claim 8, wherein the received optical input signals are transmitted through the Mach-Zehnder interferometer in response to a received switch signal.

10. The quantum key distribution method according to claim 8, further comprising emitting optical signals into the output signal path.

11. The quantum key distribution method according to claim 8, wherein establishing the shared quantum cryptographic key with the transmitter device comprises establishing a shared bit sequence and performing privacy amplification with the transmitter device, in particular via a classical information channel.

* * * * *